United States Patent [19]
Arnold et al.

[11] Patent Number: 5,136,710
[45] Date of Patent: Aug. 4, 1992

[54] DYNAMIC INACTIVATION OF PROGRAM EXITS OF THE APPLICATION PROGRAM WHILE THE SYSTEM PROGRAM IS RUNNING

[75] Inventors: Michael E. Arnold, Snow Camp, N.C.; Graham P. Bate, Gaithersburg, Md.; Alan F. Brodnick, Raleigh, N.C.; Joel M. Salzman, North Potomac; Timothy L. Spickler, Middletown, both of Md.

[73] Assignee: International Business Machines Corporation, Armonk, N.Y.

[21] Appl. No.: 541,429

[22] Filed: Jun. 21, 1990

[51] Int. Cl.5 .................................................. G06F 9/00
[52] U.S. Cl. .................................... 395/700; 364/286; 364/280
[58] Field of Search ... 364/200 MS File, 900 MS File; 395/700

[56] References Cited

U.S. PATENT DOCUMENTS

| | | | |
|---|---|---|---|
| 4,389,706 | 6/1983 | Gomola et al. | 364/130 |
| 5,036,484 | 7/1991 | McCoy et al. | 364/900 |
| 5,067,073 | 11/1991 | Andrews | 395/375 |

OTHER PUBLICATIONS

*IBM MVS/ESA System Programming Library: Installation Exits: JES2 Version 3, JES3 Version 3*, Dec. 1989, pp. 1-12.
*IBM Network Program Products (NCP, NETVIEW, VTAM) Planning*, Oct. 1988, pp. 120, 123 & 145.

*Primary Examiner*—Lawrence E. Anderson
*Attorney, Agent, or Firm*—Jerry W. Herndon

[57] ABSTRACT

An arrangement and method of inactivating dynamically an exit in a computer system. An exit is a program module associated with a first program and which is invoked while active by a second program in response to the occurrence of a prescribed system event. When a request to inactivate exit is received, it is determined if one or more invocations of the exit are in progress or scheduled. If an invocation of the exit is not in progress or scheduled, the exit is marked as inactive. However, if one or more invocations of the exit are in progress or scheduled, the exit is marked as inactive only when all such invocations that are in progress or scheduled are complete.

12 Claims, 6 Drawing Sheets

DYNAMIC INACTIVATION OF PROGRAM EXITS OF THE APPLICATION PROGRAM WHILE THE SYSTEM PROGRAM IS RUNNING

TECHNICAL FIELD

The invention is related to data processing and to data processing systems in general. More particularly, it is related to the interface between system software and application programs for the purpose of passing information to the applications.

BACKGROUND OF THE INVENTION

Application programs running under the control of a system program often are associated with defined program modules called exits. The system program calls (invokes) these exits to pass information about events, system or otherwise, to the application programs. A typical use might be to pass system error information to an application program. Another example might be to pass network link status information to an application program whose task it is to monitor and manage a communications network.

Because of changes to parameters associated with the exit modules or to the modules themselves, customers often have the need to reload the exit modules. The process of modifying an exit module requires the changes to be implemented into a source module and this new module to be compiled and loaded into the system. However, if currently active, the existing exit module must first be inactivated before the new module can be loaded. Present methods of inactivation require one of the following: shutting down the entire system program or inactivating the exit without first determining if an invocation to the exit is active or pending.

The first prior art method of reloading an exit module requires the orderly shutdown of the system program. This results in complete loss of the system function for the period of time for which the system program is not running. This is often not acceptable to customers, even for short periods of time, because of the disruption to the system. For example, in the case of telecommunications access control software, such as VTAM software, (VTAM is a trademark of the IBM Company), shutdown means shutdown of the communications function of an entire network. Obviously, this is very undesirable. The second method allows for the inactivation of a specific exit without terminating the system program, but does not take into consideration the possibility that the exit module may be presently executing or that one or more invocations may be pending (queued). In this situation, an application program could receive corrupted information when an inactive exit is invoked, or possibly terminate abnormally, again with potentially serious consequences. Other problems may also occur when an invocation occurs to an exit that is no longer present.

Other prior art, the Job Entry System for example, a software product marketed by the IBM Company, provides a way for an exit to be manually activated or inactivated from a control console. However, even in this art, no technique is provided to determine if an exit is being invoked or if an invocation is pending before inactivating it. To merely inactivate an exit in such a system may cause problems similar to those already mentioned. Thus, in the known prior art, there is no way to safely inactivate an exit, for reloading or otherwise, other than by halting the operation of the system program in an orderly way.

SUMMARY OF THE INVENTION

The invention is an arrangement and method of inactivating dynamically an exit in a computer system. An exit is a program module associated with a first program and which is invoked while active by a second program in response to the occurrence of a prescribed system event. When a request to inactivate exit is received, it is determined if one or more invocations of the exit are in progress or scheduled. If an invocation of the exit is not in progress or scheduled, the exit is marked as inactive. However, if one or more invocations of the exit are in progress or scheduled, the exit is marked as inactive only when all such invocations that are in progress or scheduled are complete.

In the preferred embodiment, when it is determined that one or more invocations of the exit are in progress or scheduled, the state of the exit is marked as pending inactive. All attempted invocations of the exit are denied if the exit state is not marked as active. The completion of all in progress or scheduled invocations of the exit are determined by incrementing a counter on each successful invocation of the exit and decrementing the counter each time an invocation of the exit completes. A zero state of the counter means that there are no such in progress or scheduled invocations. If the state of an exit is "pending inactive" when an invocation completes and the counter state is zero, then the exit may be safely inactivated.

DETAILED DESCRIPTION

Figure 1:
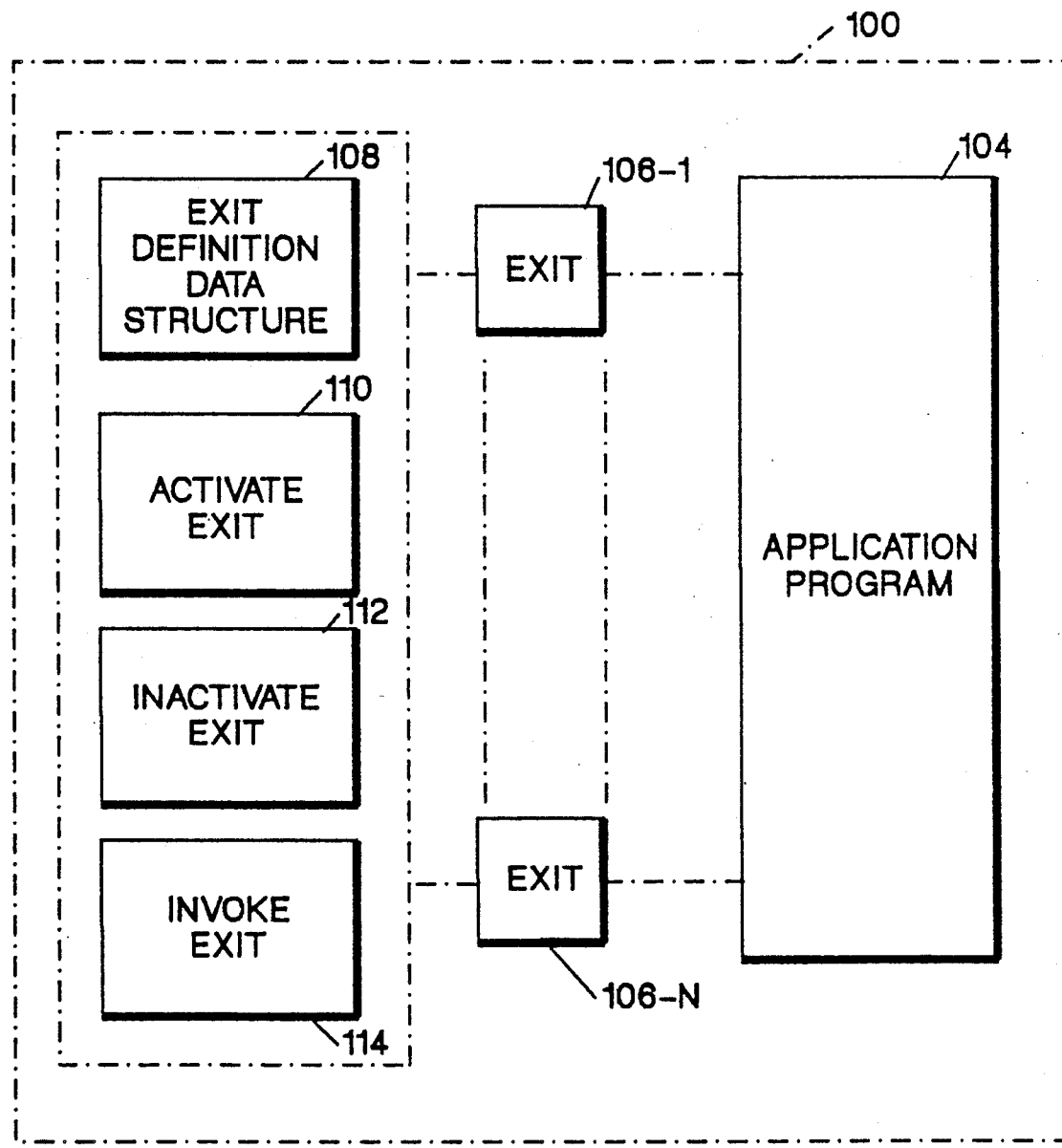
FIG. 1 shows a computer system including a system program, an application program, a plurality of exits used for passing information from the system program to the application program, a data structure for defining exits and activate, inactivate and invoke programs for controlling the exits in accordance with the invention.

FIG. 1 shows a computer system 100 including a system program 102, an application program 104 and a plurality of exit program modules 106-1 through 106-N. The exit program modules are used by the system program for passing information to the application program. Associated with the system is a data structure 108 for defining the exit modules. Also associated with the system are activate, inactivate and invoke programs 110, 112 and 114, respectively, for controlling the exits in accordance with the invention.

Figure 2:
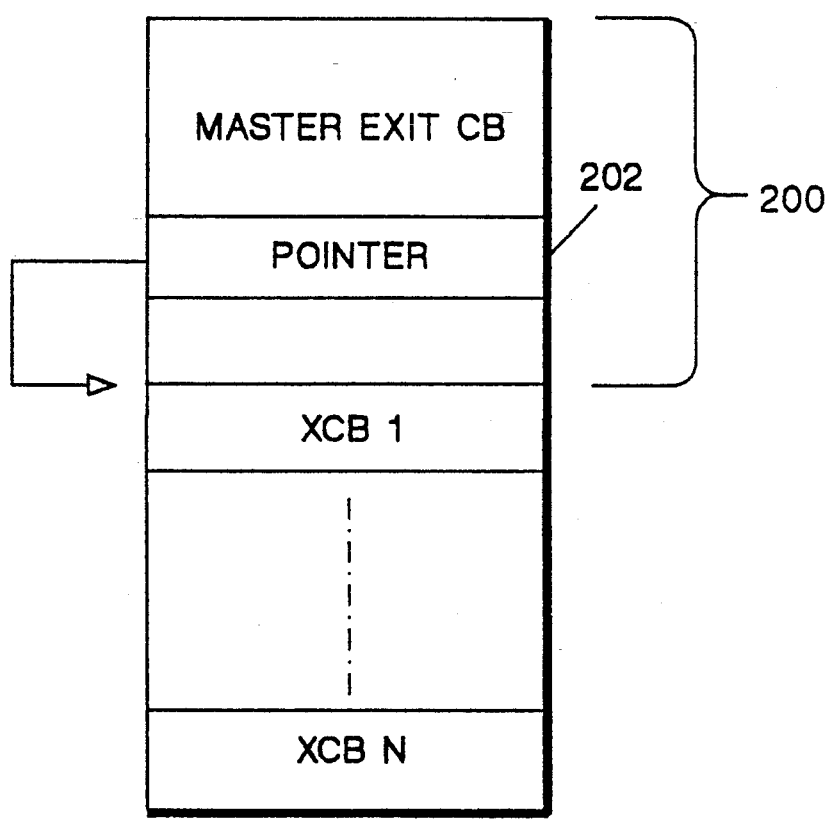
FIG. 2 shows an illustrative exit control block data structure which includes an exit control block for each defined exit in a system.
Figure 3:
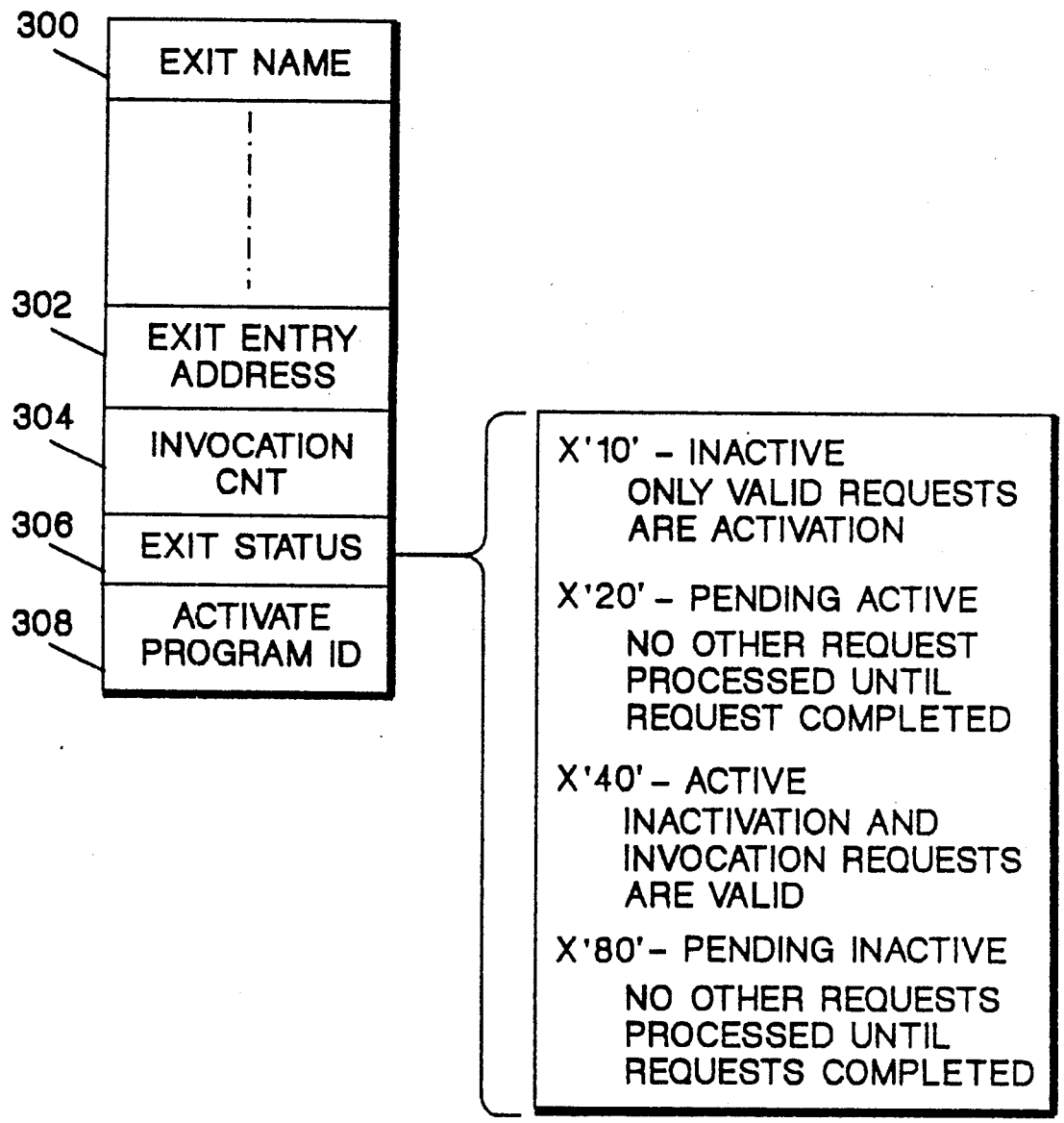
FIG. 3 shows illustrative details of one exit control block.

The exit definition data structure provides the means of identifying one or more exits to the system. FIG. 2 shows the data structure associated with the exit definition. When an exit is to be activated, deactivated or invoked, the system refers to a master exit control block 200. This master control block contains a pointer 202 to the first of a number of exit control blocks (XCBs). Each defined exit is associated with a separate XCB. FIG. 3 shows the illustrative details of an XCB. Each exit has its own name, which is stored in a name field 300. The main memory address at which the exit is loaded, i.e., the invoke address or entry point address, is stored in field 302. Field 304 contains an invocation counter which is used to track the number of presently active invocations (instances) of an exit, as will be seen. Field 306 contains an exit status indication. As shown to the right of this field, four status states are defined, INACTIVE, PENDING ACTIVE, ACTIVE AND PENDING INACTIVE. Finally, a field 308 contains an identification of the program that activates an exit. The master control block 200 and the XCBs are loaded into main memory during initialization of an system program associated with the exits.

Activation of an exit enables the exit so that it can be invoked by the system to pass information to the associated application. Inactivation of an exit disables the exit, thereby preventing its invocation. Exit activation, inactivation and invocation are triggered by the use of an INLINE macro specifying either an ACT (activate), INACT (inactivate) or INVOKE parameter, respectively. Table 1 below describes the format of the INLINE macro and its parameters. In the table, " " surrounds variable data that must be supplied to the macro. "|" separates the options that pertain to supplied data.

TABLE 1

INLINE MACRO

INLINE
    ACT|INACT|INVOKE
EXIT( name )
PLIST(parm1,parm2, . . . ,parmn)
AREA( workarea address )
RTNCODE( return code address) )
PROG(program ID)

ACT requests exit activation.
INACT requests exit inactivation.
INVOKE calls an exit.
EXIT names the exit in question.
PLIST lists the parameters that are passed to a called exit.
AREA specifies a memory work area used to build any parameter lists to be passed to the exit.
RTNCODE specifies a memory location in which to store a return code of the request.
PROG contains an identity of a program that is executing the macro.

A number of the features of the INLINE macro are not pertinent to the invention and will not be discussed in detail.

The INLINE macro, when used for activation and inactivation, queues requests that are subsequently processed by the system software to call the activate or inactivate programs of FIGS. 4 and 5, respectively. Use of the macro for exit invocation results in a direct call of the invocation program shown in FIG. 6. Accordingly, in the preferred embodiment, all invocation requests result in an immediate executing instance of the exit module, as opposed to a pending (queued) request to the exit. However, this is a straight-forward design option and does not limit the scope of the invention in any way. Pending exits can easily be accommodated by merely incrementing the invocation counter when an invocation request is queued, rather than when an instantiation of the exit is created, as will be discussed with respect to FIG. 6.

Figure 4:
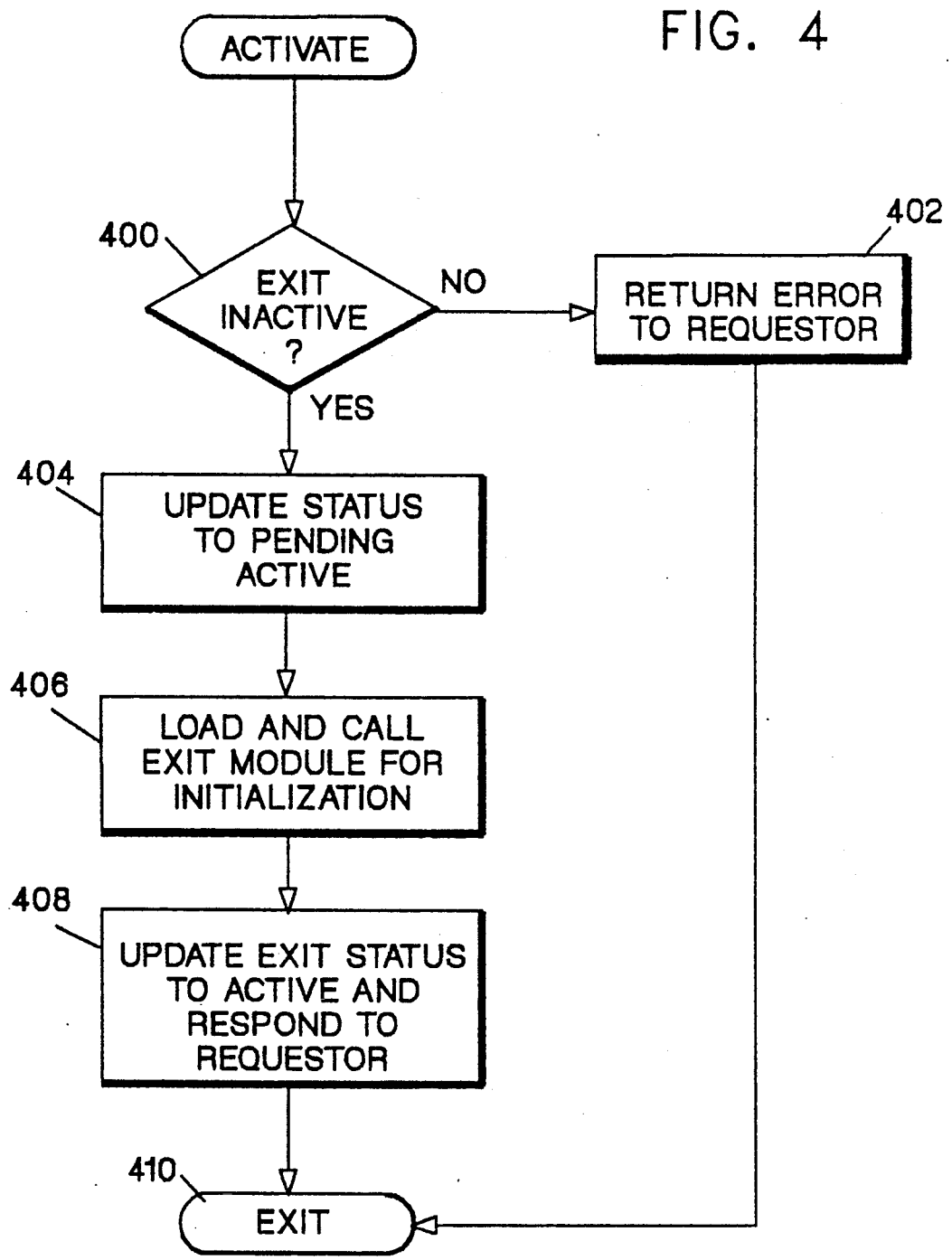
FIG. 4 shows an illustrative flow diagram of the steps for activating an exit module.
Figure 5:
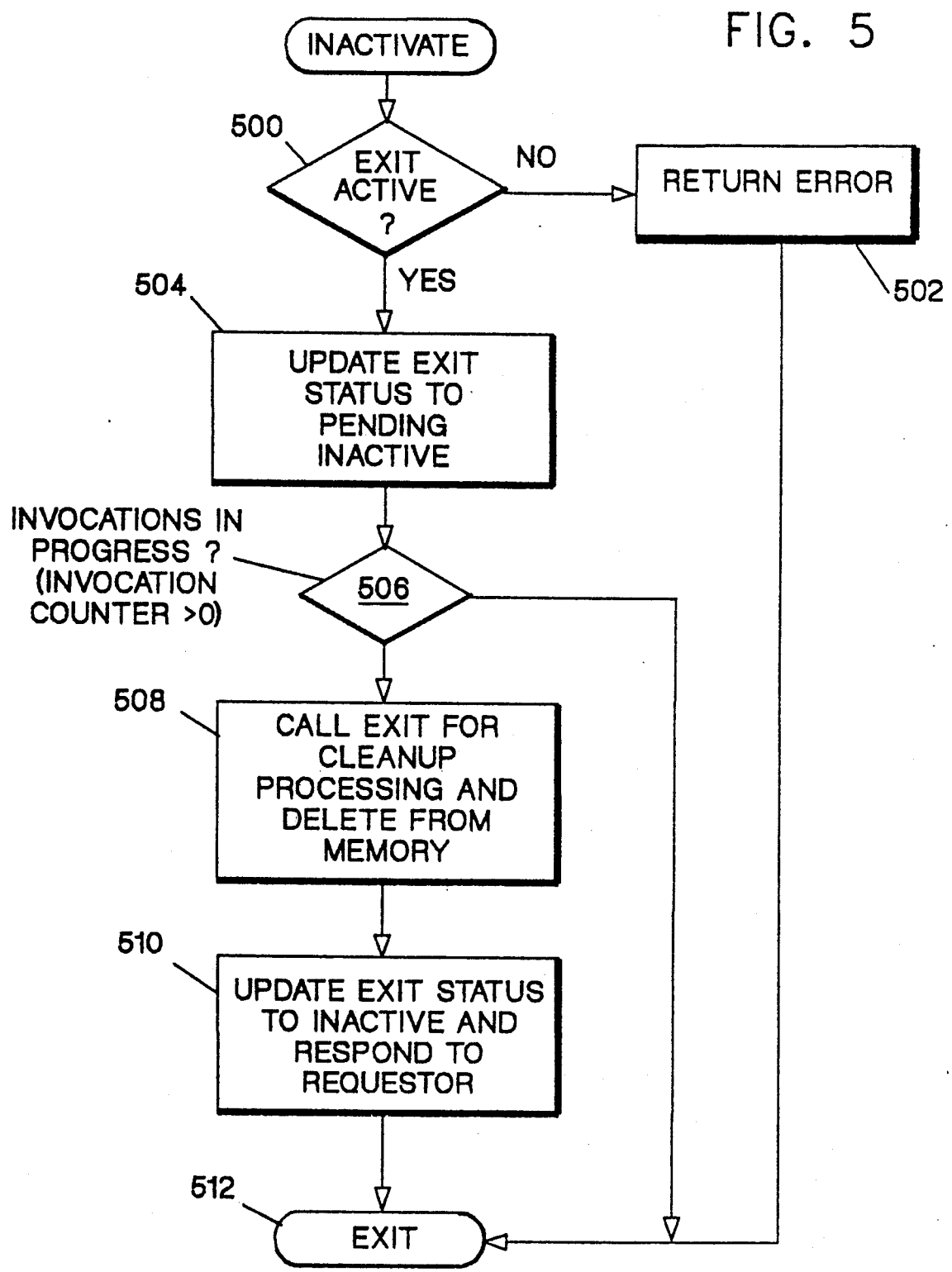
FIG. 5 shows an illustrative flow diagram of the steps for inactivating an exit module.

The exit activation program of FIG. 4 is executed when the system serves a queue request for exit activation. Such activation may have been requested by a system program or by an application. Step 400 first validates that the exit in question is in an inactive state by checking the exit status field 306 in FIG. 3. If the exit is in a state other than inactive, step 402 notifies the requesting program that the activation request failed. If the exit status field 306 indicates that the exit is inactive, step 404 updates field 306 to a "pending active" state. Step 406 next loads the exit module into main memory and invokes it to perform any initialization that it may require. Upon completion of the exit's initialization, step 408 marks the exit status field 306 as active and saves the identity of the requesting program in the activate program ID field 308 of the XCB. This program ID is contained in the INLINE macro call and is stored in the activate queue request. At this point, the requesting program is notified that the request was successful and the exit is ready to process subsequent inactivation and invocation requests.

Requests to inactivate an exit are generated either by an application program or by the system in the event an invoked exit has encountered an unrecoverable error (not shown). An inactivation request is initiated by issuing the INLINE macro specifying the parameter INACT. FIG. 5 illustrates the flow of the inactivation sequence that is executed when the queue request for the inactivation is processed by the system. As shown at step 500, requests for exit inactivation are only processed if the exit status is marked active in the exit status field 306 of the Exit Control Block. Otherwise, step 502 notifies the requesting program that the inactivation request was unsuccessful. After step 500 validates that the exit status is active, step 504 updates the exit status field 306 to indicate that a inactivation request is pending. The request is completed at this time only if step 506 determines that there are no invocations to this exit in progress (or pending if queued invocations are used). This is indicated by a zero state of the invocation count field 304 of the Exit Control Block, as will be explained below. If the invocation count state is nonzero, this inactivation request is ignored for the time being. It is restored later by the invocation sequence of FIG. 6 when the last active instance of an invoked exit is completed. If there are no invocations in progress at step 506, the exit is called to perform any cleanup processing the exit may require. When the exit returns control, step 508 deletes the exit module from main memory and updates the exit status field 306 to indicate that the exit is now inactive. A response is then issued to the program that originated the inactivation request to alert it that its inactivate request is completed. When an exit is inactivated, the only valid requests for that exit are for activation.

Figure 6:
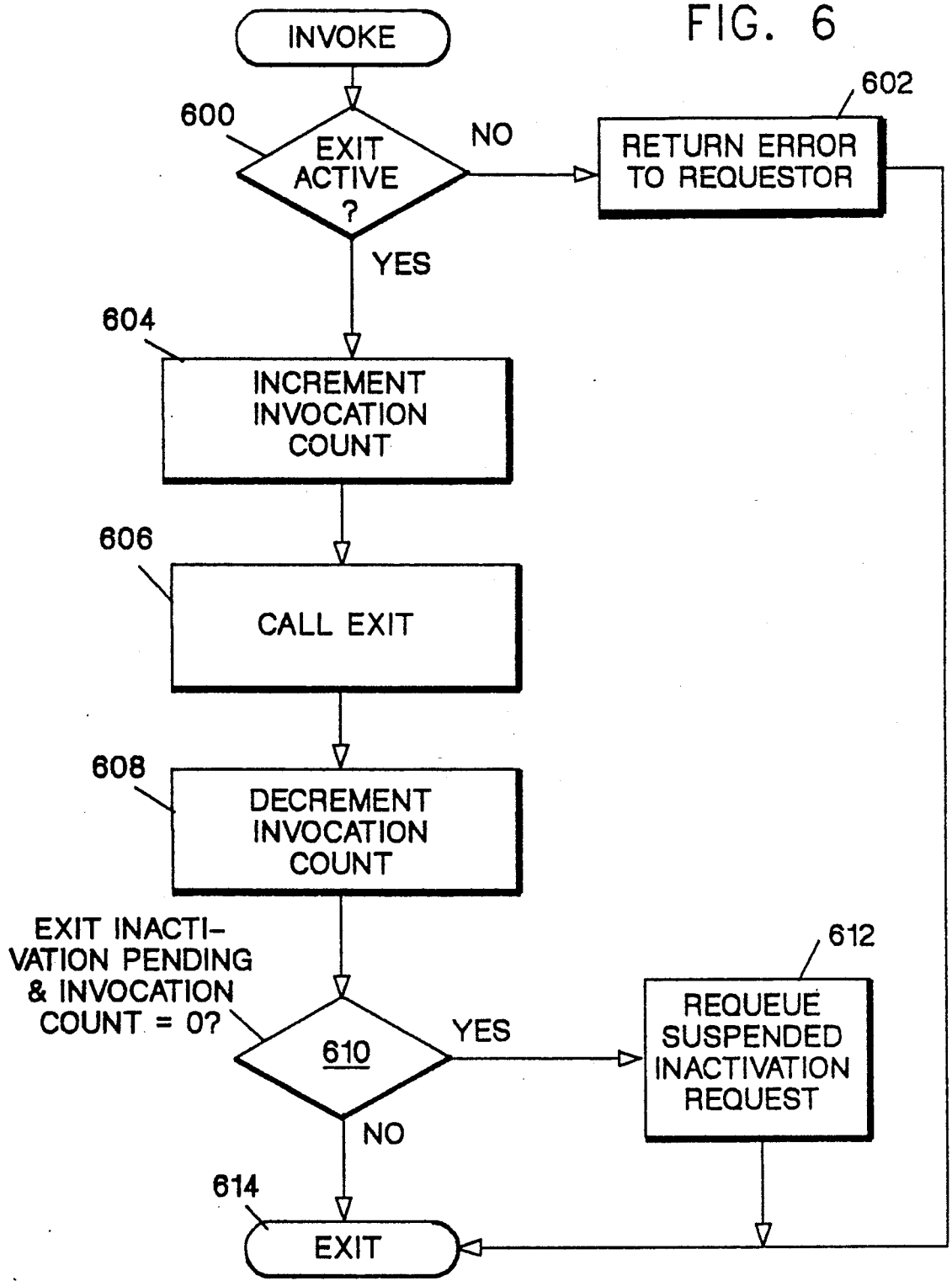
FIG. 6 shows an illustrative flow diagram of the steps for invoking an exit module.

Requests to invoke an exit are initiated from predefined invocation points within the system program using the INLINE macro specifying the parameter INVOKE. The invocation program of FIG. 6 is coded to be reentrant so that multiple instances can be executed concurrently. Each instance executes the following steps. The status of the specified exit is checked at step 600 to verify that it is presently active. If it is not, an error message is returned to the requestor at step 602 and the request is ignored. If the exit is active, step 604 increments the invocation counter 304 to reflect the number of invocations of the exit that are in progress. The exit is then invoked at step 606. As mentioned, this invocation immediately instantiates the exit in the preferred embodiment. If queued invokes were used instead, step 606 would be replaced with a queue request to subsequently call the exit. When the exit completes its processing and returns control, the invocation counter 304 is decremented at step 608. This step and the remaining steps of FIG. 6 would be performed by the invoke queue server if such an embodiment were used. Step 610 now determines if a previous inactivation request that was ignored at step 606 of the inactivation program should now be requeued for processing. If exit inactivation is pending and the invocation counter 304 is now zero, step 612 requeues an inactivation request for this exit. This causes a subsequent entry to the inactivation program in FIG. 5. It should be noted that if the invocation counter 304 is not zero at step 610 for this instance of the invocation program, a subsequent instance will eventually requeue the inactivation request if it is the last instance to be completed.

It is to be understood that the above described arrangements are merely illustrative of the application of principles of the inveniton and that other arrangements may be devised by workers skilled in the art without departing from the spirit and scope of the invention.

We claim:

1. In a system comprising at least one computer, a memory, a system program and an application program executable by the computer under the control of the system program, a method executed by the computer of inactivating dynamically an exit while the system program is running, by rendering the exit inaccessible to the system program, wherein an exit is a program module associated with the application program and to which an access is scheduled by the system program in response to the occurrence of a prescribed system event, said method comprising the steps of
    a) determining by searching the memory, in response to an inactivate exit request if one or more accesses of the exit are in progress or scheduled.
    b) if an access of the exit is not in progress or scheduled, marking the exit as inactive in a memory location associated with the exit to render it inaccessible to the system progress, and
    c) if one or more accesses of the exit are in progress or scheduled, marking the exit as inactive only when all such in progress or scheduled accesses are complete.

2. The method of claim 1 wherein step c) further comprises:
    marking the state of the exit as pending inactive if one or more accesses of the exit are in progress or scheduled.

3. The method of claim 1 wherein step c) further comprises:
    periodically testing for completion of all in progress or scheduled accesses of the exit.

4. The method of claim 1 or claim 2 or claim 3 further comprising the step of
    examining the state of an exit on an attempt to access the exit, and
    denying the access attempt if the exit state is not marked as active.

5. The method of claim 3 further comprising:
    incrementing a counter for each successful access of the exit, and
    decrementing the counter each time an access of the exit completes.

6. The method of claim 5 wherein the step of testing further comprises testing the counter for a nonzero state.

7. In a system comprising at least one computer, a memory, a system program and an application program executable by the computer under the control of the system program, a method executed by the computer of inactivating dynamically an exit while the system program is running by rendering the exit inaccessible to the system program, wherein an exit is a program module associated with the application program and which is accessed by the system program in response to the occurrence of a prescribed system event, said method comprising the steps of
    marking an exit inactive in a memory location associated with the exit to render it inaccessible to the system program in response to an inactivate request if there are no accesses of the exit in progress or scheduled,
    suspending the inactivation request if one or more accesses of the exit are in progress or scheduled and marking the exit as pending inactive,
    denying any new request to access the exit while it is marked pending inactive,
    testing for the completion of all scheduled accesses of the exit at the completion of each access request while it is marked pending inactive, and
    marking the exit inactive when all accesses are complete.

8. In a system comprising at least one computer, a memory, a system program and an application program executable by the computer under control of the system program, an arrangement for controlling the system to inactivate dynamically an exit while the system program is running, by rendering the exit inaccessible to the system program, wherein an exit is a program module associated with the application program and which is accessible by the system program in response to the occurrence of a prescribed system event, said arrangement comprising:
    a) means responsive to an inactivate exit request signal for searching the memory to determine if one or more accesses of the exit are in progress or scheduled,
    b) means responsive to the searching means for inactivating the exit if an access of the exit is not in progress or scheduled,
    c) means activated by the searching means for ascertaining when present or scheduled accesses of the exit are complete, and
    d) means responsive to the ascertaining means for subsequently inactivating the exit.

9. The arrangement of claim 8 wherein the determining means further comprises
    means for marking the state of the exit as pending inactive if one or more accesses of the exit are in progress or scheduled.

10. The arrangement of claim 8 or claim 9 further comprising:
    means responsive to an attempt to access the exit for testing the state of the exit, and
    means responsive to the testing means for denying the access attempt if the exit state is not marked as active.

11. The arrangement of claim 8 wherein the determining means further comprises:

a counter, means for incrementing the counter on each successful access of the exit, and means for decrementing the counter each time an access of the exit completes.

12. The arrangement of claim 11 wherein the ascertaining means further comprises means for testing the counter for a nonzero state.

* * * * *